United States Patent
Nagu et al.

(10) Patent No.: US 11,866,664 B2
(45) Date of Patent: Jan. 9, 2024

(54) GREEN CORROSION INHIBITOR FROM WASTE VEGETABLE OIL FOR OIL AND GAS APPLICATIONS

(71) Applicant: Saudi Arabian Oil Company, Dhahran (SA)

(72) Inventors: Muthukumar Nagu, Dhahran (SA); Jothibasu Ramasamy, Dhahran (SA); Nayef M. Alanazi, Dhahran (SA); Md Amanullah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/344,863

(22) Filed: Jun. 10, 2021

(65) Prior Publication Data

US 2022/0396742 A1 Dec. 15, 2022

(51) Int. Cl.
*C10G 75/02* (2006.01)
*C09K 8/54* (2006.01)

(52) U.S. Cl.
CPC .............. *C10G 75/02* (2013.01); *C09K 8/54* (2013.01); *C09K 2208/32* (2013.01); *C10G 2300/4075* (2013.01)

(58) Field of Classification Search
CPC .................................. C10G 75/02; C09K 8/54
See application file for complete search history.

(56) References Cited

U.S. PATENT DOCUMENTS

| 5,174,913 A | 12/1992 | Alford et al. |
| 5,366,643 A | 11/1994 | Walker |
| 5,556,451 A | 9/1996 | Minevski |
| 6,013,200 A | 6/2000 | Prince |
| 6,448,411 B1 | 9/2002 | Meyer |
| 7,057,050 B2 | 6/2006 | Meyer |
| 7,951,754 B2 | 5/2011 | Tiwari et al. |
| 8,618,027 B2 | 12/2013 | Meyer et al. |
| 9,074,289 B2 | 7/2015 | Malwitz et al. |
| 9,834,718 B2 | 12/2017 | Amanullah et al. |
| 10,221,368 B2 | 3/2019 | Benitez Aguilar et al. |

(Continued)

FOREIGN PATENT DOCUMENTS

| BR | 102017026662 A2 | 6/2019 |
| CN | 102978624 A | 3/2013 |

(Continued)

OTHER PUBLICATIONS

John M. Dyer, Sten Stymne, Allan G. Green, and Anders S. Carlsson; High-value oils from plants; 2008; The Plant Journal; ed. 54; 640-655 (Year: 2008).*

(Continued)

*Primary Examiner* — Randy P Gulakowski
*Assistant Examiner* — Kevin Burke Swecker
(74) *Attorney, Agent, or Firm* — Leason Ellis LLP

(57) ABSTRACT

An ecofriendly corrosion inhibitor composition and a method for inhibiting corrosion on a metal surface with the ecofriendly corrosion inhibitor composition are provided. The ecofriendly corrosion inhibitor composition includes 10-30 weight % of fatty acids derived from waste vegetable oils and 70-90 weight % of heavy aromatic naphtha. The fatty acids derived from waste vegetable oils include oleic acid, linoleic acid, and palmitic acid. In the method, the ecofriendly corrosion inhibitor composition is added to a hydrocarbon fluid exposed to the metal surface and the corrosion inhibitor composition inhibits corrosion on the metal surfaces.

7 Claims, 3 Drawing Sheets

(56) References Cited

U.S. PATENT DOCUMENTS

Figure 1:
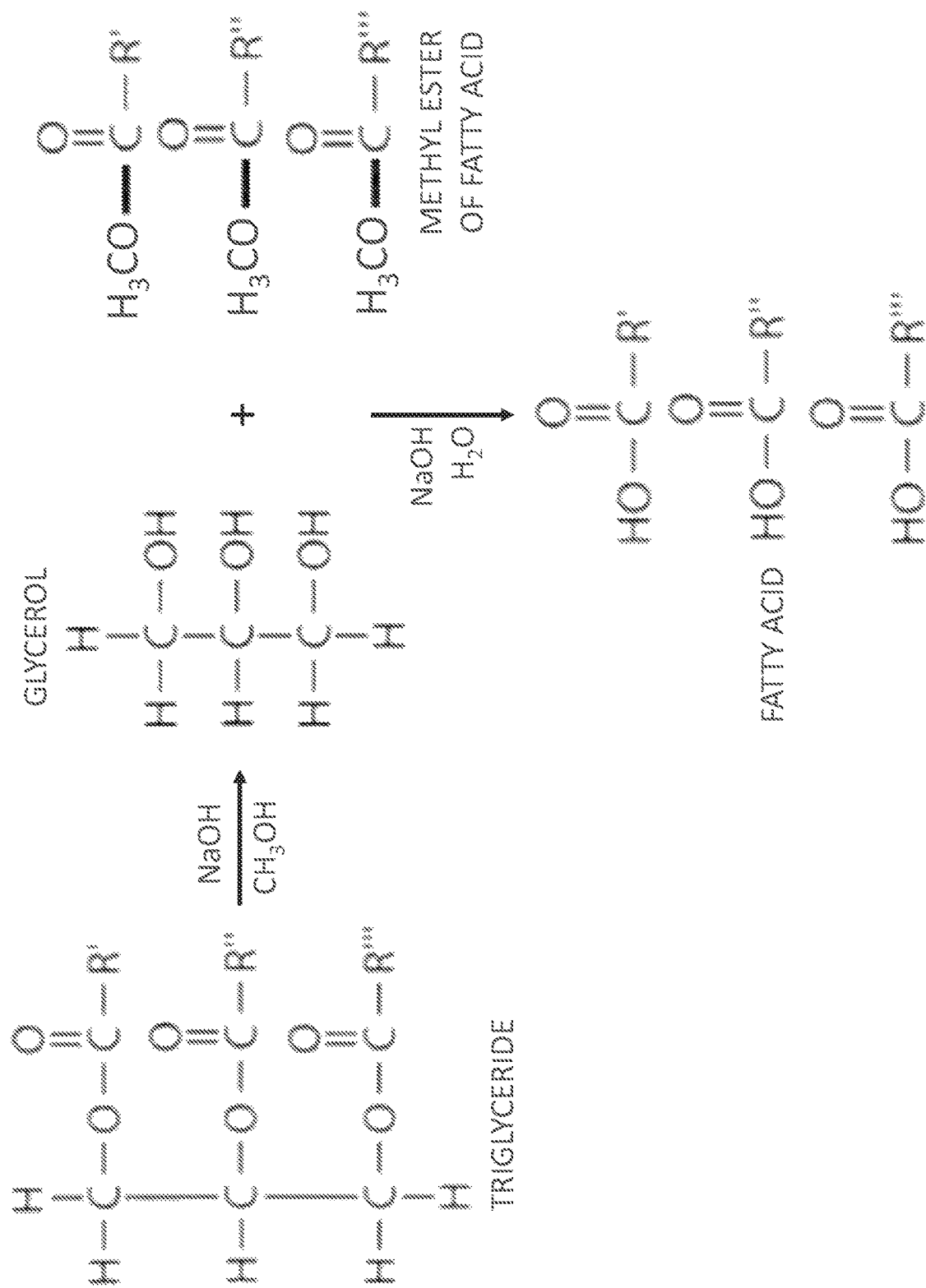

| | | | |
|---|---|---|---|
| 10,385,254 B2 | 8/2019 | Ramasamy et al. | |
| 2010/0210485 A1* | 8/2010 | Cadix | C09K 8/502 |
| | | | 507/224 |
| 2014/0091262 A1 | 4/2014 | Webber et al. | |
| 2015/0119301 A1* | 4/2015 | McDaniel | E21B 43/267 |
| | | | 507/224 |
| 2017/0306067 A1 | 10/2017 | Kurth et al. | |
| 2018/0148632 A1* | 5/2018 | Bennett | C23F 11/161 |

FOREIGN PATENT DOCUMENTS

| | | |
|---|---|---|
| CN | 108192579 A | 6/2018 |
| CN | 110760858 A | 2/2020 |
| EP | 1043423 A2 | 10/2000 |
| MX | 2015017118 A | 6/2017 |
| UA | 8626 U | 9/1996 |
| UA | 82921 U | 8/2013 |

OTHER PUBLICATIONS

Zhukov et al., "New Green Oil-Field Agents." Green Chemistry—Environmentally Benign Approaches. Intech Open Access Publisher, 2012. 121-138.

P. Rostron et al., "Novel synthesis and characterization of vegetable oil derived corrosion inhibitors." Journal of Material and Environmental Sciences 8.12 (2017): 4292-4300.

* cited by examiner

GREEN CORROSION INHIBITOR FROM WASTE VEGETABLE OIL FOR OIL AND GAS APPLICATIONS

TECHNICAL FIELD

The present disclosure is generally related to chemical compositions, and more particularly related to corrosion inhibitor compositions.

BACKGROUND OF THE DISCLOSURE

In the oil and gas industry, corrosion is often caused by the presence of acidic gases and high salt concentrations in the produced water. For example, dissolved acidic gases such as carbon dioxide ($CO_2$) and hydrogen sulfide ($H_2S$)—which cause "sweet" and "sour" corrosion, respectively, on metals surfaces—can result in major damage to pipelines and equipment. These types of corrosion can cause serious safety concerns and increased costs. High levels of salt in the produced water can further exacerbate corrosion in the pipelines and equipment.

To combat the effects of acidic gases and salt water, equipment has conventionally been composed of high alloy steels including stainless steels, austenitic stainless steels and high chromium content steels. Additionally, low-cost carbon steels are sometimes used in combination with organic corrosion inhibitors or coatings. These corrosion inhibitors are used generally to minimize the corrosion in a wide variety of systems and equipment components, such as oil wells, production lines, transporting pipelines, and gas oil separation plants. Generally, these corrosion inhibitors are nitrogen-based compounds, such as imidazolines, amido-amines, and pyrimidine salts, and non-nitrogen based compounds such as dimer trimer acid. However, these conventional corrosion inhibitors can have detrimental effects on downstream processing units and can negatively affect product quality. Additionally, these conventional corrosion inhibitors are harmful to the environment.

The present application addresses these and other challenges related to mitigating and preventing corrosion in refinery equipment.

SUMMARY OF THE DISCLOSURE

In a first aspect, an ecofriendly corrosion inhibitor composition is provided. The corrosion inhibitor composition comprises 10-30 weight % of fatty acids derived from waste vegetable oils, and the fatty acids comprise oleic acid, linoleic acid, and palmitic acid. The corrosion inhibitor composition also comprises 70-90 weight % of heavy aromatic naphtha (HAN), and the corrosion inhibitor composition inhibits corrosion on metal surfaces.

In another aspect, the composition comprises approximately 20 weight % of the fatty acids derived from waste vegetable oils and approximately 80 weight % of heavy aromatic naphtha. In a further embodiment, the fatty acids comprise approximately 60-70 weight % of the oleic acid, approximately 10-20 weight % of the linoleic acid, and approximately 5-10 weight % of the palmitic acid.

In another aspect, the composition is free of nitrogen compounds. In another aspect, the corrosion is caused by carbon dioxide gas or hydrogen sulfide gas. In another aspect, the corrosion is caused by naphthenic acid.

In a second aspect, a method for inhibiting corrosion on a metal surface is provided. In the method, an ecofriendly corrosion inhibitor composition is added to a hydrocarbon fluid exposed to the metal surface, and the corrosion inhibitor composition inhibits corrosion on metal surfaces. The added corrosion inhibitor composition comprises 10-30 weight % of fatty acids derived from waste vegetable oils, where the fatty acids comprise oleic acid, linoleic acid, and palmitic acid. The added corrosion inhibitor composition also comprises 70-90 weight % of heavy aromatic naphtha.

In another aspect, the added corrosion inhibitor composition comprises approximately 20 weight % of the fatty acids derived from waste vegetable oils and 80 weight % of heavy aromatic naphtha. In a further aspect, the fatty acids comprise approximately: 60-70 weight % of the oleic acid; 10-20 weight % of linoleic acid; and 5-10 weight % of palmitic acid.

In another aspect, the corrosion inhibitor composition is added to the hydrocarbon fluid in a concentration of approximately 10 ppm to approximately 500 ppm. In a further aspect, the corrosion inhibitor composition is added to the hydrocarbon fluid in a concentration of approximately 200 ppm.

In another aspect, the added corrosion inhibitor composition is free of nitrogen compounds. In another aspect, the corrosion is caused by carbon dioxide gas or hydrogen sulfide gas. In another aspect, the corrosion is caused by naphthenic acid.

BRIEF DESCRIPTION OF THE DRAWING FIGURES

FIG. 1 display a diagram of an exemplary procedure for converting waste vegetable oils into fatty acids in accordance with one or more embodiments.

Figure 2A:
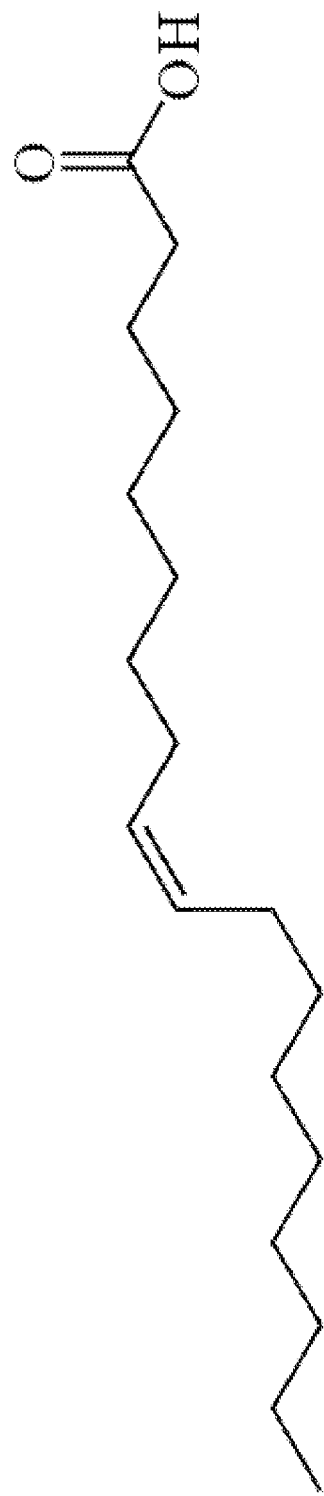
Figure 2B:
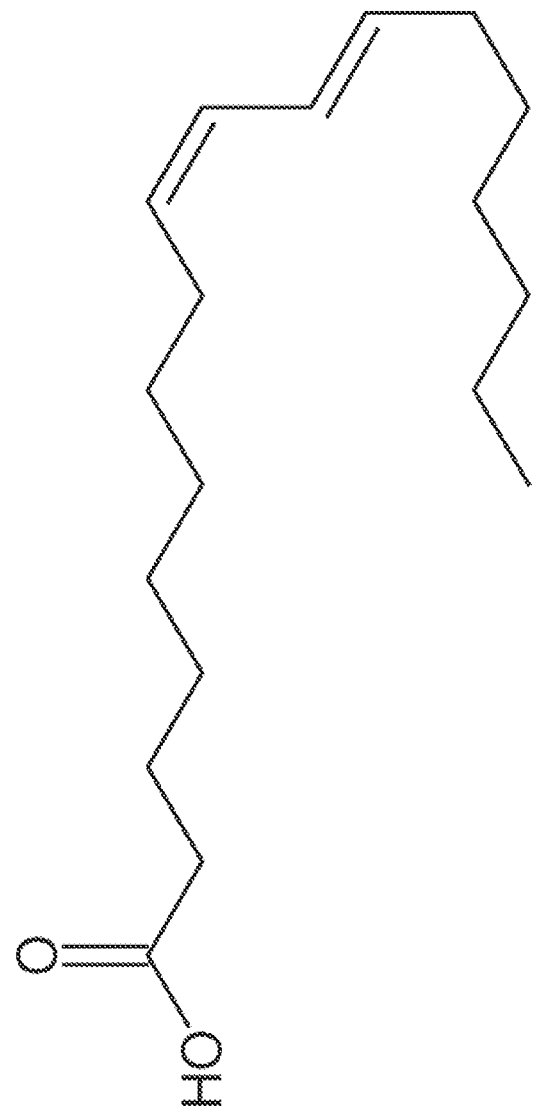
Figure 2C:
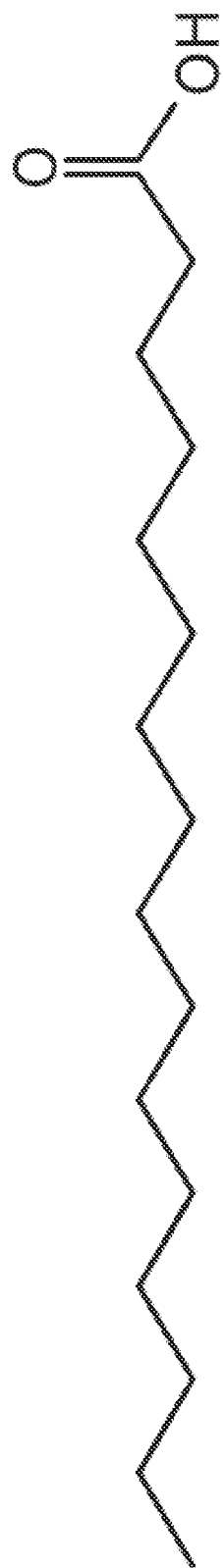

FIGS. 2A-2C displays chemical structures of fatty acids included in the ecofriendly corrosion inhibitor composition (oleic acid—FIG. 2A; linoleic acid—FIG. 2B; palmitic acid—FIG. 2C) in accordance with one or more embodiments.

DETAILED DESCRIPTION OF CERTAIN EMBODIMENTS

The present application discloses environmentally friendly ("ecofriendly" or "green") corrosion inhibitor compositions and methods for inhibiting corrosion on metal surfaces exposed to hydrocarbon fluids using the environmentally friendly corrosion inhibitor compositions. The corrosion inhibitor compositions of the present application can comprise (i) fatty acids derived from waste vegetable oils, and (ii) heavy aromatic naphtha (HAN).

In one or more embodiments, the "green" corrosion inhibitor compositions of the present application are free of nitrogen compounds. The addition of the corrosion inhibitor composition to the hydrocarbon fluid can mitigate or prevent corrosion on the metal surfaces typically caused by the hydrocarbon fluid. In such an embodiment, the corrosion inhibitor composition of the present application is added to an acidic crude oil, thereby reducing the amount of corrosion that occurs on the metal surfaces exposed to the acidic crude oil.

As such, the present "green" corrosion inhibitor compositions and methods can be used to reduce corrosion in various refinery units, such as crude distillation units, vacuum distillations units, and furnaces, that are exposed to hydrocarbon fluids. The present corrosion inhibitor compositions and methods can be effective in both "sweet" and "sour" corrosion environments.

These and other aspects of the present compositions and methods are described in further detail below with reference to the accompany drawing figures, in which one or more illustrated embodiments and/or arrangements of the corrosion inhibitors are shown. The compositions and methods of the present application are not limited in any way to the illustrated embodiments and/or arrangements. It should be understood that the compositions and methods as shown in the accompanying figures are merely exemplary of the compositions and methods of the present application, which can be embodied in various forms as appreciated by one skilled in the art. Therefore, it is to be understood that any structural and functional details disclosed herein are not to be interpreted as limiting the present compositions and methods, but rather are provided as a representative embodiment and/or arrangement for teaching one skilled in the art one or more ways to implement the present compositions and methods. Further, as used in the present application, the term "approximately" when used in conjunction with a number refers to any number within 5% of the referenced number, including the referenced number.

The environmentally-friendly ("eco-friendly") corrosion inhibitor compositions of the present application generally comprise fatty acids derived from waste vegetable oils, and heavy aromatic naphtha (HAN). In one or more implementations, the heavy aromatic naphtha as mentioned herein is the compound identified by CAS #64742-94-5.

Vegetable oil is a triglyceride extracted from a plant. Triglycerides are esters of glycerol and three fatty acids. Depending on the source, vegetable oil can contain mixture of different types of fatty acids such as saturated, mono-unsaturated, poly-unsaturated, omega 3, omega 6, or omega 9, for example. Most of the commonly used oils that are used for cooking, such as olive oil, palm oil, sunflower oil, corn oil and peanut oil, contain most of the fatty acid types mentioned above. Vegetable oil is a promising source for emulsifiers as they have different types of fatty acids in the form of triglycerides, but the use of pure vegetable oil as a raw material for the synthesis of emulsifiers is not a viable option.

However, the present application discloses that vegetable oils that are used for cooking, for example, and disposed as waste can be used as a sustainable source for oil and gas corrosion inhibitors.

The waste vegetable oils can be converted into the fatty acids used in the present corrosion inhibitors using various methods, includes those described in U.S. Pat. Nos. 10,385,254 and 9,834,718, which are hereby incorporated by reference in their respective entireties. FIG. 1 displays an exemplary procedure for converting waste vegetable oils into fatty acids. Briefly, the waste/used vegetable oil (triglyceride) is first converted into glycerol and a methyl ester of fatty acid by base hydrolysis with methanol. In a second step, the methyl ester of fatty acid is hydrolyzed using a base (e.g., NaOH) in water to yield a mixture of fatty acids.

In one or more embodiments, the fatty acids in the present corrosion inhibitor composition, which are derived from the waste vegetable oils, can comprise oleic acid, linoleic acid, and palmitic acid. FIGS. 2A-2C displays the chemical structures of these fatty acids (oleic acid—FIG. 2A; linoleic acid—FIG. 2B; palmitic acid—FIG. 2C) in accordance with one or more embodiments. In one or more embodiments, the fatty acids derived from waste vegetable oils make up approximately 10-30 weight % of the composition and heavy aromatic naphtha makes up approximately 70-90 weight % of the composition. In at least one embodiment, the composition comprises approximately 20 weight % of the fatty acids derived from waste vegetable oils and approximately 80 weight % heavy aromatic naphtha.

In one or more embodiments, the fatty acids, which make up approximately 20 weight % of the composition, are comprised of approximately 60-70 weight % of the oleic acid, 10-20 weight % of linoleic acid, and 5-10 weight % of palmitic acid.

In one or more embodiments, the present composition is free of nitrogen compounds. Conventional corrosion inhibitors for oil and gas production and transporting pipeline corrosion mitigation, particularly for sweet or sour corrosion environments, have typically included nitrogen-based or carboxylic acid chemistry. However, nitrogen-based corrosion inhibitors can negatively affect the downstream process units as well as product quality. Accordingly, in accordance with one or more embodiments, the corrosion inhibitor compositions of the present application are not only environmentally friendly due to be derived from waste vegetable oil, but are also nitrogen free, and thus avoid negative effects on downstream processing units.

The corrosion inhibitor compositions of the present application can inhibit or prevent corrosion cause by a variety of corrosive compounds. For example, in one or more embodiments, the present corrosion inhibitor composition inhibits or prevents corrosion caused by carbon dioxide gas ("sweet" corrosion) and/or hydrogen sulfide gas ("sour" corrosion). In at least one embodiment, the present corrosion inhibitor composition inhibits or prevents corrosion caused by naphthenic acid.

In accordance with one or more embodiments, the present application also provides a method for inhibiting corrosion on a metal surface. In the method, an ecofriendly corrosion inhibitor composition of the present application is added to a hydrocarbon fluid exposed to the metal surface. In one or more embodiments, the corrosion inhibitor composition is added to the hydrocarbon fluid in a concentration of approximately 10 ppm to approximately 500 ppm. In at least one embodiment, the corrosion inhibitor composition is added to the hydrocarbon fluid in a concentration of approximately 200 ppm. The addition of the corrosion inhibitor composition to the hydrocarbon fluid prevents or inhibits corrosion on the metal surface caused by the hydrocarbon fluid. In one or more embodiments, the corrosion is caused by carbon dioxide gas or hydrogen sulfide gas.

In at least one embodiment, the corrosion is caused by naphthenic acid. Specifically, in one or more embodiments using the present compositions and methods, the corrosion inhibitor compositions can mitigate or prevent naphthenic acid corrosion that is induced during high-temperature (e.g., 200° C. to 400° C.) refinery processes, such as distillation of an acidic crude oil. For example, in one or more embodiments, the present corrosion inhibitor composition can be added to an acidic crude oil that is used in a high-temperature refinery unit, such as a crude distillation unit. Acidic crude oil typical causes naphthenic acid corrosion on the metal surfaces of a crude distillation unit over time. However, the addition of the corrosion inhibitor composition to the acidic crude oil mitigates the occurrence naphthenic acid corrosion or, in certain implementations, prevents naphthenic acid corrosion from occurring on the metal surfaces exposed to the acidic crude oil. In one or more embodiments, the corrosion inhibitor composition is added to the hydrocarbon fluid (e.g., acidic crude oil) after it enters the refinery unit. As such, the corrosion inhibitor composition(s) of the present application can be continuously added in the hydrocarbon fluid at a selected parts per million (ppm) amount to protect the refinery equipment from naphthenic acid corrosion.

Example—Linear Polarization Resistance Technique

In the present example, an exemplary corrosion inhibitor composition of the present application was tested to show its ability to inhibit corrosion on metal coupons exposed to sweet corrosion environmental conditions in accordance with one or more embodiments herein.

Specifically, the corrosion inhibition efficiency of an exemplary ecofriendly corrosion inhibitor composition of the present application was evaluated by linear polarization resistance (LPR) method. The chemical composition of the exemplary ecofriendly corrosion inhibitor composition is characterized by high performance liquid chromatography (HPLC) and the chemical structures of major synthesized fatty acids in the composition are presented in Table 1 and FIGS. 2A-2C. Table 2 shows the composition of the exemplary ecofriendly corrosion inhibitor made from synthesized fatty acids from waste vegetable oil. In this formulation, heavy aromatic naphtha (HAN) was used to dissolve the active compounds of fatty acids (FA).

In general, the LPR measurements were carried out using a glass setup with the volume capacity of 1000 ml. A carbon steel coupon was used to measure the corrosion for 72 hours. The setup was purged constantly with $CO_2$ and a measurement temperature was maintained at 60° C. throughout experiment. An initial 100 ppm of the corrosion inhibitor composition was injected after a stable baseline is obtained for each sample. 4 hours after the first injection of the corrosion inhibitor composition, 100 ppm of the corrosion inhibitor composition was again injected, and the corrosion rate was observed until the end of the experiment. Data acquisition was completed with software that enabled measurement of the time and corrosion rate. Based on LPR results, the exemplary corrosion inhibition composition of the present application showed high corrosion inhibition efficiency.

TABLE 1

List of synthesized fatty acids from waste vegetable oil and their composition in fatty acid portion of corrosion inhibitor composition (Formulation 1)

| Name of the Fatty Acid | % in Fatty Acid Component |
|---|---|
| Oleic acid | approximately 60-70% |
| Linoleic acid | approximately 10-20% |
| Palmitic acid | approximately 5-10% |

TABLE 2

Chemical composition of developed formulation (Formulation 1)

| Corrosion inhibitor composition | Fatty acid from waste vegetable oil (%) | Heavy Aromatic Naphtha (%) |
|---|---|---|
| | 20 | 80 |

Procedure

The corrosion inhibition efficiency of an exemplary corrosion inhibitor composition of the present application (formulation 1) was evaluated using LPR to obtain the polarization resistance (Rp) through the utilization of a three electrodes system: (i) counter electrode (platinum), (ii) reference standard calomel electrode (SCE), and (iii) working electrode (carbon steel C1018) in accordance with ASTM method G59-97. The LPR measurements were carried out using a glass setup with the volume capacity of 1000 mL connected to a potentiostat Interface 1010E from Gamry Instruments. The carbon steel C1018 coupon was used to measure the corrosion for 72 hours. The setup was purged constantly with $CO_2$ at constant rate (25 ml/min) and measurement temperature was maintained at 60° C. throughout experiment. An initial 100 ppm of the corrosion inhibitor composition was injected after a stable baseline is obtained for each sample. Four hours after the first injection, a second injection of 100 ppm of corrosion inhibitor composition was injected and corrosion rate was observed till the end of experiment. The corrosion Inhibition efficiency (IE) of each inhibitor was calculated using the following equation:

Corrosion inhibition efficiency (%)={(corrosion rate without inhibitor−corrosion rate with inhibitor)/(corrosion rate without inhibitor)}×100.

The corrosion rate in mils per year (mpy) was calculated by the following formula:

MPY={534×Weight loss in mg}/(Density in gm/cc)×(Area in inch$^2$)×(Test duration in hours).

Results

Based on the experimental results, the exemplary corrosion inhibitor composition of the present application (formulation 1) showed high corrosion inhibition efficiency in sweet corrosion environmental conditions (i.e., 60° C. and presence of carbon dioxide; 3.5% NaCl in the test solution). The corrosion inhibition efficiency of formulation 1 is presented in Table 3. As shown in Table 3, 76% corrosion inhibition was attained with formulation 1 at a concentration of 200 ppm. The corrosion rate was 47 mpy with formulation 1, while the corrosion rate for the blank carbon steel C1018 coupon was 192 mpy in 3.5% sodium chloride solution in presence of $CO_2$ at 60° C. Thus, as shown in this example, metal surfaces in the oil and gas transporting pipelines, production lines, and process plants can be protected by adding the corrosion inhibitor composition of the present application.

TABLE 3

Corrosion rate data of carbon steel C1018 in 3.5% sodium chloride solution at 60° C.

| Run | Experimental System | Concentration (ppm) | Corrosion rate (mpy) | Corrosion inhibition (%) |
|---|---|---|---|---|
| 1 | Blank (without corrosion inhibitor) | 0 | 192 | NA |
| 2 | Formulation 1 | 200 | 47 | 76 |

Accordingly, the present application provides corrosion inhibitors from waste vegetable oil for corrosion mitigation in oil and gas applications including production, transporting pipeline and gas oil separation plant in presence of "sweet" and "sour" corrosion environments, for example. Because they are derived from waste vegetable oil, the present corrosion inhibitor compositions are "green" and ecofriendly.

Although much of the foregoing description has been directed to compositions and methods for inhibiting corrosion on metal surfaces in refineries or pipelines, the compositions and methods disclosed herein can be similarly deployed and/or implemented in scenarios, situations, and settings far beyond the referenced scenarios. It should be further understood that any such implementation and/or deployment is within the scope of the composition and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for inhibiting corrosion on a metal surface, the method comprising:
    adding an ecofriendly corrosion inhibitor composition to a hydrocarbon fluid exposed to the metal surface, wherein the corrosion inhibitor composition comprises:
        20 weight % of fatty acids derived from waste vegetable oils, wherein the fatty acids comprise approximately 60-70 weight % of oleic acid, approximately 10-20 weight % of linoleic acid, and approximately 5-10 weight % of palmitic acid; and
        80 weight % of heavy aromatic naphtha (HAN), wherein the corrosion inhibitor composition inhibits corrosion on metal surfaces.

2. The method of claim 1, wherein the ecofriendly corrosion inhibitor composition is added to the hydrocarbon fluid in a concentration of approximately 10 ppm to approximately 500 ppm.

3. The method of claim 2, wherein the ecofriendly corrosion inhibitor composition is added to the hydrocarbon fluid in a concentration of approximately 200 ppm.

4. The method of claim 1, wherein the ecofriendly corrosion inhibitor composition is free of nitrogen compounds.

5. The method of claim 1, wherein the corrosion is caused by carbon dioxide gas or hydrogen sulfide gas.

6. The method of claim 1, wherein the corrosion is caused by naphthenic acid.

7. The method of claim 1, wherein the fatty acids are converted from the waste vegetable oils via base hydrolysis with methanol and subsequent base hydrolysis with NaOH in water.

* * * * *